(12) United States Patent
Eichinger et al.

(10) Patent No.: US 7,577,399 B2
(45) Date of Patent: Aug. 18, 2009

(54) METHOD AND COMMUNICATION STATION FOR TRANSMITTING DATA

(75) Inventors: Josef Eichinger, Neufinsing (DE);
Tobias Giebel, Wolfsburg (DE); Mattias Lampe, Alfeld (DE); Hermann Rohling, Wolfenbüttel (DE); Egon Schulz, München (DE); Wolfgang Zirwas, Gröbenzell (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 292 days.

(21) Appl. No.: 10/518,585

(22) PCT Filed: Jun. 16, 2003

(86) PCT No.: PCT/EP03/06333

§ 371 (c)(1),
(2), (4) Date: Jun. 3, 2005

(87) PCT Pub. No.: WO04/002082

PCT Pub. Date: Dec. 31, 2003

(65) Prior Publication Data

US 2005/0272366 A1      Dec. 8, 2005

(30) Foreign Application Priority Data

Jun. 21, 2002  (DE) ............................... 102 27 852
Jun. 21, 2002  (EP) ................................. 02013827

(51) Int. Cl.
*H04B 7/15* (2006.01)
(52) U.S. Cl. ............. 455/11.1; 455/13.1; 455/16; 455/24; 455/41.2; 370/315; 370/279; 714/748

(58) Field of Classification Search ............. 455/9, 455/7, 11.1, 13.1, 16, 18, 22, 24, 41.2, 445, 455/15, 428; 370/279, 315, 341, 349, 392; 714/748, 751
See application file for complete search history.

(56) References Cited

U.S. PATENT DOCUMENTS 4,051,438  A  *  9/1977  Pickett et al. ............... 455/105

(Continued)

FOREIGN PATENT DOCUMENTS

EP         0851632 A2       7/1998

(Continued)

OTHER PUBLICATIONS

Dube et al., "Signal Stability-Based Adaptive Routing (SSA) for Ad Hoc Mobile Networks", IEEE Personal Communications, Feb. 1997, pp. 36-45.

*Primary Examiner*—Matthew D Anderson
*Assistant Examiner*—Shaima Q Aminzay
(74) *Attorney, Agent, or Firm*—Staas & Halsey LLP

(57) ABSTRACT

In a method for the error-monitored transmission of data via interfaces of a multi-step communication system, the data is transmitted from a transmitter station to a data-receiving station via at least two relay stations which are connected therebetween and receive and further transmit the data parallel to each other. The data is retransmitted if the transmission has been insufficient due to a request from the receiver end and/or due to the lack of a confirmation from the receiver end. In order to increase performance while reducing power consumption of the system, the request or confirmation is generated only by the receiver station and is sent back to the transmitter station. The relay stations consequently do not generate any confirmations or requests.

20 Claims, 1 Drawing Sheet

U.S. PATENT DOCUMENTS

| | | | |
|---|---|---|---|
| 4,882,765 A | | 11/1989 | Maxwell et al. |
| 4,905,234 A | * | 2/1990 | Childress et al. ............ 370/349 |
| 5,898,679 A | * | 4/1999 | Brederveld et al. ......... 370/315 |
| 7,065,364 B1 | * | 6/2006 | Todd ........................... 455/445 |
| 7,113,745 B2 | * | 9/2006 | Khayrallah ................ 455/41.2 |
| 2003/0108031 A1 | * | 6/2003 | Inden ......................... 370/352 |
| 2003/0179721 A1 | * | 9/2003 | Shurmantine et al. ....... 370/315 |

FOREIGN PATENT DOCUMENTS

| | | |
|---|---|---|
| WO | WO00/74306 A2 | 12/2000 |
| WO | WO01/15374 A1 | 3/2001 |

* cited by examiner

METHOD AND COMMUNICATION STATION FOR TRANSMITTING DATA

CROSS REFERENCE TO RELATED APPLICATIONS

This application is based on and hereby claims priority to PCT Application No. PCT/EP2003/006333 filed on Jun. 16, 2003, European Application No. 02013827.7 filed on Jun. 21, 2002, and German Application No. 102 27 852.0 filed on Jun. 21, 2002, the contents of which are hereby incorporated by reference.

BACKGROUND OF THE INVENTION

The invention relates to a method for the error-monitored transmission of data over parallel interfaces of a multi-step communication system In multi-step communication systems, referred to also as multi-hop communication systems, data is transmitted from a transmitting station to an ultimately receiving station either directly or over a multiplicity of intermediate stations or relay stations connected therebetween. As well as being transmitted over a single intermediately connected relay station, the data can also be transmitted over a multiplicity of relay stations connected in series one behind the other, which is referred to also as a multi-hop arrangement. Especially, furthermore, in SFN (SFN: Single Frequency Network) communication systems, one and the same signal, and hence one and the same set of data, can be received by a plurality of relay stations simultaneously or, as the case may be, with a slight delay, and transmitted directly to the receiving station or to a further relay station jointly, which is to say simultaneously or correspondingly slightly delayed and using the same frequency. Preemphasis or deemphasis methods can be employed here in the relay stations to increase the efficiency. In order to ensure error-free data transmission, use is made of various error detection and error correction methods, for example an automatic request to repeat the transmission of an original or modified data packet (ARQ: Automatic Repeat Request), which are known per se from communication systems of the type or from other communication systems. The use of what is termed a cyclic redundancy check (CRC) is also known. The methods are applied anew to each individual transmission, which is to say to each transmission from the transmitting station to an adjacent relay station, to each transmission from one relay station to another relay station, and to each transmission from a relay station to the receiving station. Although this approach indeed ensures that the data will reach the receiving station as error-free as possible over a maximum number of paths, the high level of computing power and time expenditure associated therewith is disadvantageous. The approach is furthermore highly energy-intensive since, on the one hand, the unpacking, decoding, and checking of received data in the relay stations and the requesting of a retransmission, or repeated encoding and onward transmission, are processes that consume energy and, on the other hand, the repeated transmission of re-sent data packets finally likewise consumes energy.

WO 01/15374 A1 discloses a method for transmitting an alarm message wherein, if a first transmitter is outside the range of the target receiver, the message is transmitted repeatedly by one or more other transceiver units located within range until the reception of the message by the target receiver is acknowledged by an acknowledgement signal.

U.S. Pat. No. 4,882,765 discloses a method wherein a repeater station automatically retransmits a message to the receiving station on the basis of a preset number of already completed retransmissions by the transmitting station or on the basis of an acknowledgement not received from the receiving station.

Finally, WO 00/74306 A2 discloses a system having a plurality of nodes wherein each node hands off a message received from another node to a subsequent node. In this scheme all the nodes use the same reference frequency.

SUMMARY OF THE INVENTION

One possible object of the invention is to improve a method for the error-monitored transmission of data over parallel interfaces of a multi-step communication system, in terms in particular of the processing effort expended in the overall system, and to propose communication stations for implementing a method of the type.

The inventors propose new methods for the error-monitored transmission of data over parallel interfaces of a multi-step communication system as well as a new communication station.

Because acknowledgements or, as the case may be, requests to repeat a data transmission are only generated by the receiving station, which is to say as a rule by the last station in the transmission chain, only that station has to monitor received data for satisfactory reception quality. If satisfactory reception quality is detected, also only that station will dispatch a thus generated acknowledgement or, as the case may be, request in the direction of the station originally sending the data. The intermediately connected relay stations serve in the simplest case solely to forward received data or, as the case may be, to forward received acknowledgements or requests. In the simple case, the process of checking data received for forwarding is accordingly omitted in the relay stations, making faster forwarding possible as well as reduced energy consumption.

Although a relay station that checks data received for forwarding for insufficient reception quality and, depending on the outcome, will or will not forward the data or will maintain or disconnect the data connection depending on the reception quality indeed requires energy and time to check the received data, energy will in the end also be saved through prevention of forwarding and prevention of a request for a repeated data transmission. Since in a communication system of the type the originally sent data is transmitted over a multiplicity of parallel data paths, there is a sufficiently high probability that if data is lost on one transmission path and the data path concerned is then deactivated, the original data will nonetheless reach the intended destination station or, as the case may be, receiving station over at least one of the parallel transmission paths or several others. A communication system or method where the data is transmitted only over relay stations that have received the data sufficiently well or, as the case may be, with sufficient freedom from errors is therefore advantageous.

While it is advantageous for a relay station to decide autonomously whether data received for forwarding is of sufficient quality to be forwarded, it is particularly advantageous to have a method whereby information from relay stations of parallel transmission paths is also taken into account in reaching a decision. If a relay station on a parallel path signals its ability to undertake a transmission for forwarding received data very well or at a high quality level, a parallel relay station informed of this will not have to undertake additional transmission of the data possibly received with even poorer quality. This is particularly the case when the parallel data paths cross or when it is possible for every relay station to receive the forwarded data from other relay stations in its vicinity.

A multiplicity of error correction or error detection methods known per se can advantageously be employed in the relay stations, with the methods only being used to detect the quality of the received data requiring to be forwarded and not for a renewed request in the event of poor reception quality.

The use of methods of the type is especially advantageous in a communication system in which the various transmitting and receiving stations and relay stations communicate on a single frequency. These conditions are found particularly in non-centrally organized—which is to say self-organizing—communication networks of the kind typically employed for what are termed ad-hoc communication systems.

The data received on different parallel paths mutually in parallel and overlaid is advantageously overlaid in the receiving station on the receiver side and processed jointly so that a further improvement in quality can be achieved through statistical averaging and the like.

The data received on the receiver side being of better quality when averaged over its totality, there is in particular a faster aggregate bit rate, which is to say better reproduction quality, on the receiver side for the condition-dependent forwarding of data in relay stations.

A communication station for implementing a method of the type can be a transmitting station, a receiving station, or a relay station, but it can also have two or all three of the functionalities in combination. It is of practical advantage for a communication station of the type also to have, alongside a receiving/transmitting device, an analyzing device which can be a constituent part of the station's own control equipment and is designed for analyzing received data in terms of its reception quality.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBO

Figure 1:
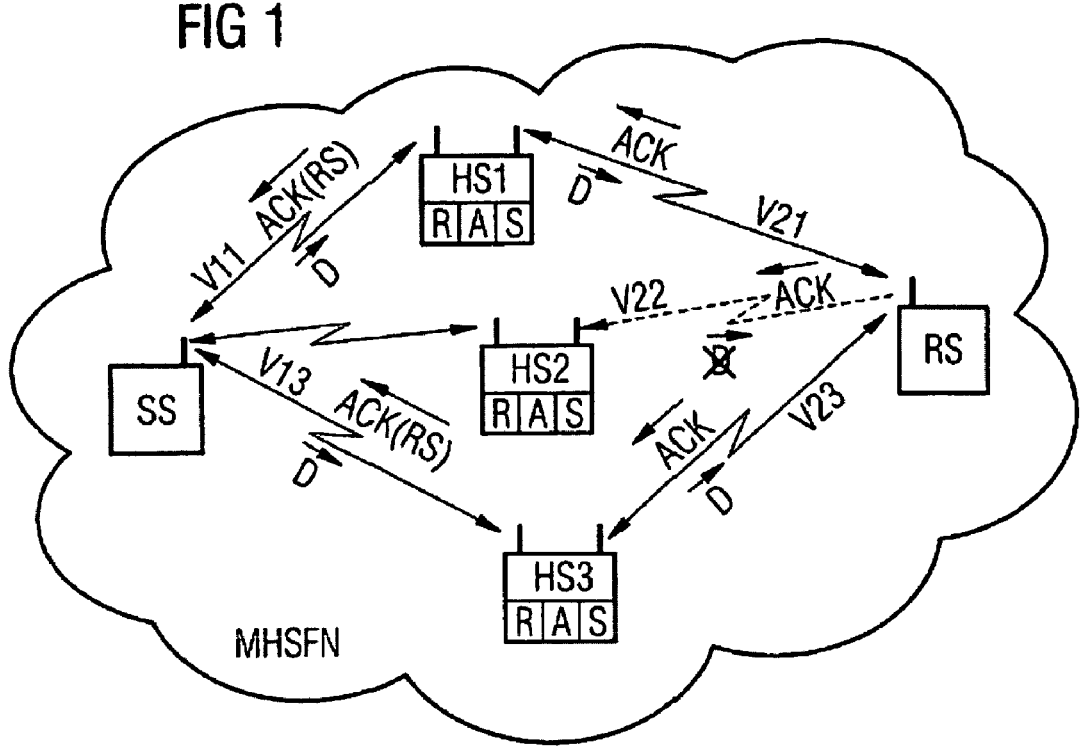
FIG. 1 is a schematic of a communication system having a multiplicity of stations communicating over parallel data connections.

Reference will now be made in detail to the preferred embodiments of the present invention, examples of which are illustrated in the accompanying drawings, wherein like reference numerals refer to like elements throughout.

As can be seen in FIG. 1, an exemplary communication system MHSFN has a multiplicity of mutually communicating stations. Shown as a communication system by way of example is a multi-step or multi-hop (MH) communication system embodied as a single frequency network (SFN). Transmission to other communication systems, in particular to ad-hoc communication systems, is, however, also possible.

A situation is shown in which a transmitting station SS sends data D to a receiving station RS. The distance between the transmitting station SS and the receiving station RS is here assumed to be too great to allow direct transmission over a direct communication link between the two. The transmitting station SS sends its data D over a multiplicity of communication interfaces V11,V12,V13 to various intermediately connected stations referred to below in the interest of simpler distinction between them as relay stations HS1,HS2,HS3. The relay stations HS1,HS2,HS3 recognize from, for instance, the data header of received data packets that the data concerned is received data D requiring to be forwarded, and forwards the received data D in the direction of the destination station, which is to say of the receiving station RS, over further communication interfaces V21,V23. The communication interfaces V11,V12,V13,V21,V23 are preferably radio interfaces operated with the same or, as the case may be, with a single frequency. In the event that the receiving station RS is already located within the transmission range of the relay stations HS1,HS3, the received data D requiring to be forwarded will be transmitted directly to the receiving station RS. Transmission will otherwise take place over further intermediately connected relay stations.

Following receipt of the data D, a check is performed by the receiving station RS to determine whether the data was received sufficiently free of errors. Customary error detection and error correction methods known per se, such as, for example, ARQ and/or CRC, can be used for the check. Following an analysis of this type, the receiving station RS sends an acknowledgement ACK confirming satisfactory reception quality and/or a request for repeated or modified transmission of the original data D in the direction of the originally transmitting station SS. The acknowledgement ACK or, as the case may be, request is in turn transmitted over a direct link or over a multiplicity of mutually parallel links V21,V11;V23,V13; V22,V12 with the relay stations HS1,HS2,HS3 connected intermediately. Depending on whether an acknowledgement ACK or a request is received, the transmitting station SS will then send new data D or, as the case may be, new data packets, or will initiate repeated and optionally modified transmission of the original data.

According to a preferred embodiment, data D received for forwarding in the relay stations HS1,HS2,HS3 is advantageously not simply forwarded unchecked but is instead checked prior to forwarding for reception quality or, as the case may be, data quality. Should one of the relay stations HS2 determine that the data quality of the data D received for forwarding is unsatisfactory or that the data D has been received containing errors, then it will not set up a connection V22 for forwarding the received data D. The corresponding data path V12,V22, originally set up from the transmitting station SS via the second relay station HS2 to the receiving station RS consequently breaks off. In particular, the second relay station HS2 will not initiate repeated transmission of the original or modified original data D, either.

Alongside a receiving device R and a transmitting device S, as well as general control equipment and storage devices required for operation, equipment and functions for checking data received for forwarding is accordingly also provided in the intermediately connected relay stations HS1-HS3. An analyzing device A is in particular provided for this which can be a constituent part of the central control equipment of the relay stations HS1-HS3.

Further equipment and/or functions serve advantageously to implement preemphasis or deemphasis methods by which it is possible to achieve, say, constructive interference of the signals at the receiving station RS and, optionally, at further intermediately connected relay stations. Methods known per se can be used, for example, such as phase or equal gain, and maximum ratio or selection bias. Combinations or extensions as well as other preemphasis techniques are also possible.

According to a further embodiment it is also possible for different relay stations HS2,HS3 to communicate among themselves. Communication takes place via an appropriate interface VH which can preferably be embodied as a radio interface but in principle also as a line-bound interface. This can be used for transmitting information about data D received for forwarding or, as the case may be, about its reception quality. This makes it possible for a third relay station HS3, after receiving data D with a very high degree of reception quality, to convey this fact to a second relay station HS which, as a parallel station, has received the same data D in parallel but with a poorer reception quality. In a case such as this the relay station HS experiencing poorer reception quality will be able to suppress the forwarding of data D received for forwarding because the same data D is being transmitted over a parallel data path SS-HS3-RS with better forwarding quality.

Data received for forwarding can generally be processed in the relay stations HS1-HS3 prior to forwarding. The type of further processing and forwarding or, as the case may be, onward transmission can here be subject to a different parameters. Signal-to-noise relations (SNR) can, for example, be evaluated at the inputs of the intermediately connected relay stations HS1-HS3. Further possibilities are to determine the number of corrected bits in a Viterbi decoder or to take the results of a cyclic redundancy check (CRC) into account. Methods for deemphasizing and amplifying a signal received for forwarding with no additional demodulation are in particular preferred as processing techniques. So that actual analysis can be carried out, the received data D is to practical advantage demodulated and decoded in relay stations HS1-HS3 in which data received for forwarding is checked. Both an embodiment is possible wherein the analyzed data D or, as the case may be, data packets is/are then encoded and modulated again for forwarding and also an embodiment wherein the data D originally received for forwarding is kept in a buffer so it can be forwarded therefrom unchanged should a duplicated set of the data be found after demodulation, decoding, and analysis to be of sufficient quality for forwarding. Methods for repeated transmission of a data packet received with errors or with insufficient quality can advantageously be deactivated if the station receiving data D is not the destination station but only a relay station.

Within the scope of onward transmission or, as the case may be, forwarding, alongside repeated encoding and modulating of data D or, as the case may be, data packets, it is also possible to perform preemphasizing. The forwarding of a received signal or, as the case may be, of received data D can in particular be carried out after deemphasizing, amplification, and possible preemphasizing.

An application is in principle possible in networks organized either on a centralized basis or on a non-centralized or self-organizing basis. Exchanging of the above-cited parameters between individual stations, in particular between relay stations, on mutually parallel data paths, can be employed particularly advantageously, as explained in the foregoing. For analysis it is, however, also possible only to employ parameters that were used in the own station, by, for example, error detection and error correction methods known per se. The application of an error correction method can, in the case of a forwarding relay station, here remain limited to the error-detecting part, with a correcting part only being used in the event that a repeated transmission is not required for this, provided transmission of the data over a sufficient number of parallel data connections has been ensured. The same applies to error detection methods which, in the case of a relay station, are preferably employed limited to the detection of the error, with a corresponding notification of error detection being suppressed.

In the case of communication between adjacent stations, in particular between relay stations HS2,HS3, it is possible, on the one hand, only to directly transmit an analysis result to adjacent stations and, on the other hand, also to deliberate on or negotiate the analysis results or, as the case may be, evaluation results between those adjacent stations which, on conclusion of a deliberation of the type, decide over which of the deliberating stations HS3 the data is to be forwarded.

Figure 2:
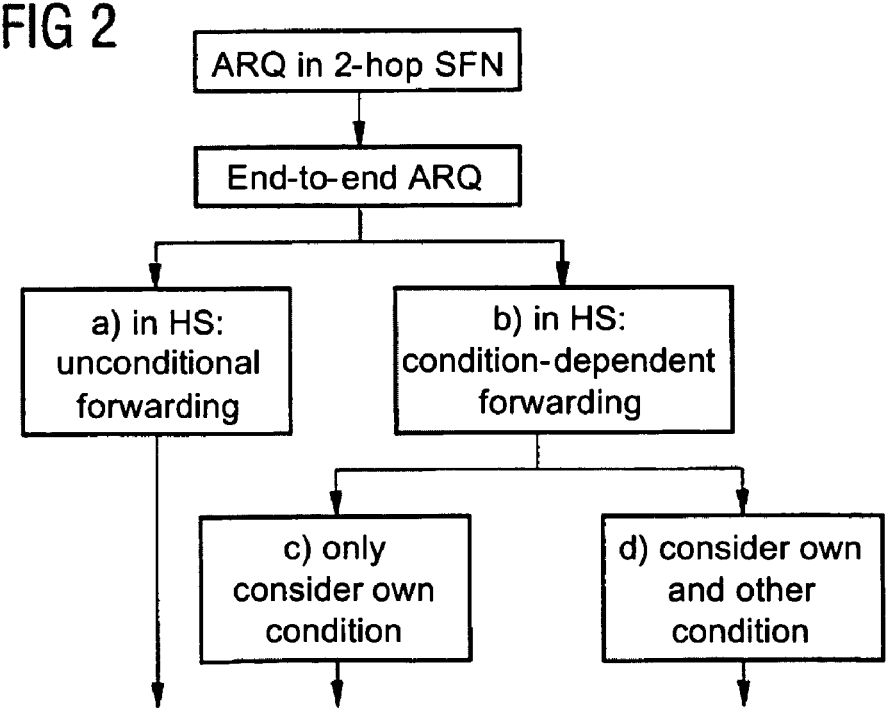
FIG. 2 is a schematic of the various possibilities for handling data received for forwarding in relay stations.

FIG. 2 serves to illustrate a plurality of variants of the exemplary embodiment shown. A focal point here is the organization of the evaluation method. For simplicity it can be assumed, for example, that only a single parameter is used which is the result of a cyclic redundancy check. The simple example further assumes that the signals received in the intermediate stations or, as the case may be, relay stations HS1-HS3 for forwarding can be fully demodulated and decoded. Assumed here is an error correction method in a 2-hop SFN communication system wherein the ARQ end-to-end connection error correction is carried out. According to the concept described in the foregoing, error corrections of the type known per se for the individual connections can be omitted. The originally transmitting station SS therefore does not receive any acknowledgements in respect of data or, as the case may be, data packets correctly received by the intermediately connected relay stations HS1-HS3. Accordingly, no separate securing of the first steps or, as the case may be, hops will be carried out. Only the receiving station RS will acknowledge correctly received packets, whereupon packets in the case of which an acknowledgement of receipt is absent will be retransmitted by the transmitting station SS when there is no acknowledgement.

There are various possibilities for the intermediately connected relay stations HS to handle the received data D or, as the case may be, data packets. According to a particularly simple embodiment a), unconditional forwarding takes place in the relay station HS. It may happen here that a data packet received with an error or a signal having a poor signal-to-noise ratio is forwarded to the receiving station RS. The evaluation of parameters and the like will be omitted in this case.

Condition-linked or, as the case may be, condition-dependent forwarding b) of received data D is therefore preferred. These conditions can be evaluated mutually independently in individual stations from among the various parallel relay stations HS or with the aid of information from all or from several relay stations HS2,HS3 communicating among themselves. There are accordingly two further variants. In the simpler instance c) an analysis of data D received for forwarding is only carried out within the station. If the analyzed data is of sufficient data quality, forwarding in the direction of the receiving station RS will be initiated. If the data quality is insufficient, forwarding in the direction of the received station RS will be prevented. The sending of acknowledgements or requests for a repeat transmission can also advantageously be omitted.

According to the other embodiment d), the communication described with reference to the second and third relay station HS2,HS3 takes place with at least one of the relay stations HS2 accessing information from at least one other of the relay stations HS3 in order to make a decision about possibly non-optimally received data D in terms of its forwarding.

Astonishingly, even the unconditional forwarding a) of data D independently of an analysis and hence independently of a satisfactory or unsatisfactory reception quality in the relay station HS is advantageous. If it is assumed that all the data paths SS-HS1-RS;SS-HS2-S;SS-HS3-RS have an approximately equal mean packet error rate PERO, then the probability that precisely n relay stations from a total of K relay stations arranged mutually in parallel will correctly receive a transmitted data packet can be formulated as follows:

$$p(n) = \binom{K}{n} \cdot (1 - PER_0)^n \cdot PER_0^{K-n}.$$

The mean number of relay stations correctly receiving the packet or, as the case may be, data and accordingly transmitting it onward can be calculated as follows:

$$E(n) = \sum_{n=0}^{K} n \cdot p(n) \approx (1 - PER_0) \cdot K.$$

Whereas with unconditional forwarding, all K intermediate stations transmit jointly in the SFN communication system, in the case of condition-dependent forwarding, which is to say in the case of analyzing a reception quality of received data D in relay stations HS1-HS3 according to the preferred embodiments, only data D will arrive at the receiving station RS via a smaller number of data paths SS-HS1-RS;SS-HS3-RS. Thus in the case of condition-dependent forwarding the receive power at the receiving station RS can be comparatively lower than in the case of unconditional forwarding of the data D by all the relay stations. However, in the case of partially suppressed forwarding the data D received at the receiving station RS is higher in data quality or, as the case may be, has a lower signal-to-noise ratio, so that overall an improvement in data quality can be observed.

The invention has been described in detail with particular reference to preferred embodiments thereof and examples, but it will be understood that variations and modifications can be effected within the spirit and scope of the invention covered by the claims which may include the phrase "at least one of A, B, and C" or a similar phrase as an alternative expression that means one or more of A, B, and C may be used, contrary to the holding in *Superguide v. DIRECTV,* 69 USPQ2d 1865 (Fed. Cir. 2004).

The invention claimed is:

1. A method for transmitting data in a radio communication system, comprising:
    transmitting data in parallel from a transmitting station to a data-receiving station over at least two relay stations, each relay station receiving and forwarding the data;
    generating requests for retransmission if it is determined that the received data is not sufficiently free of errors, the requests for retransmission being generated only at the receiving station;
    transmitting the requests for retransmission from the receiving station through at least one of the relay stations; and
    retransmitting the data from the transmitting station if a request for retransmission is received through the at least one relay station from the receiving station.

2. The method according to claim 1, wherein
    at least one of the relay stations checks the data received from the transmitting station with regard to reception quality,
    if the reception quality does not meet a determined level of quality of the received data, the relay station does not forward said data to the receiving station, and
    if the reception quality meets the determined level of quality of the received data, the relay station does forward said data to the receiving station.

3. The method according to claim 2, wherein
    the relay stations receive the data in parallel and check the reception quality of the received data,
    a first relay station receives the data with acceptable reception quality, and
    only the first relay station transmits the data to the receiver station.

4. The method according to claim 2, wherein error correction and/or error detection is performed in at least one of the relay stations prior to forwarding the data.

5. The method according to claim 1, wherein
    a plurality of the relay stations receive the data in parallel, check the reception quality of the data and produce a reception result, and
    in at least a first relay station, a determination is made on whether or not to forward the data based on the reception result of the first relay station and based on the reception result of another relay station.

6. The method according to claim 1, wherein the transmitting station, the receiving station and at least some of the relay stations belong to a radio communication system communicating on a single frequency.

7. The method according to claim 1, wherein the data is forwarded over different parallel paths via different relay stations, and the data is preemphasized and/or deemphasized in the relay stations.

8. The method according to claim 1, wherein the data is forwarded over different parallel paths via different relay stations, and the data is decoded and/or encoded in the relay stations.

9. The method according to claim 1, wherein
    the data is transmitted in parallel over different paths, and
    the data is received overlaid at the receiver station and processed jointly.

10. The method for transmitting data in a radio communication system, comprising:
    transmitting data in parallel from a transmitting station to a data-receiving station over at least two relay stations, each relay station receiving and forwarding the data;
    acknowledging receipt of the data with an acknowledgement by the data-receiving station;
    transmitting requests for retransmission from the data-receiving station through at least one of the relay stations; and
    retransmitting the data in the event of unsuccessful transmission of the data, when the acknowledgement is not received, retransmission of the data being controlled only by the transmitting station.

11. The method according to claim 10, wherein
    at least one of the relay stations checks the data received from the transmitting station with regard to reception quality,
    if the reception quality does not meet a determined level of quality, the relay station does not forward said data to the receiving station, and
    if the reception quality meets the determined level of quality, the relay station does forward said data to the receiving station.

12. The method according to claim 11, wherein
    the relay stations receive the data in parallel and check the reception quality of the received data, a first relay station receives the data with acceptable reception quality, and only the first relay station transmits the data to the receiver station.

13. The method according to claim 11, wherein error correction and/or error detection is performed in at least one of the relay stations prior to forwarding the data.

14. The method according to claim 10, wherein a plurality of the relay stations receive the data in parallel, check the reception quality of the data and produce a reception result, and in at least a first relay station, a determination is made on whether or not to forward the data based on the reception result of the first relay station and based on the reception result of another relay station.

15. The method according to claim 10, wherein the transmitting station, the receiving station and at least some of the relay stations belong to a radio communication system communicating on a single frequency.

16. A relay station of a radio communication station, comprising:

a receiving device to receive data destined for a receiving station, the data being parallely transmitted from a transmitting station of the radio communication station;

an analyzing device to analyze said data with regard to its reception quality and produce a reception result; and a transmitting device to selectively forward the data to the receiving station, depending on directly receiving the reception result of the analyzing device.

17. The relay station according to claim 16, wherein the data is transmitted in parallel to a plurality of relay stations, and the relay station forwards the data only if its data reception is superior to that of other relay stations.

18. The relay station according to claim 16, further comprising a processing device to preemphasize and/or deemphasize the data.

19. The relay station according to claim 16, further comprising a processing device to decode and/or encode the data.

20. The relay station according to claim 16, further comprising a processing device to decode the data, preemphasize and/or deemphasize the data and then re-encode the data.

* * * * *